L. ANDERSON.
KNOTTER FOR HARVESTING MACHINES.
APPLICATION FILED OCT. 1, 1908.
984,639.
Patented Feb. 21, 1911.
4 SHEETS—SHEET 1.
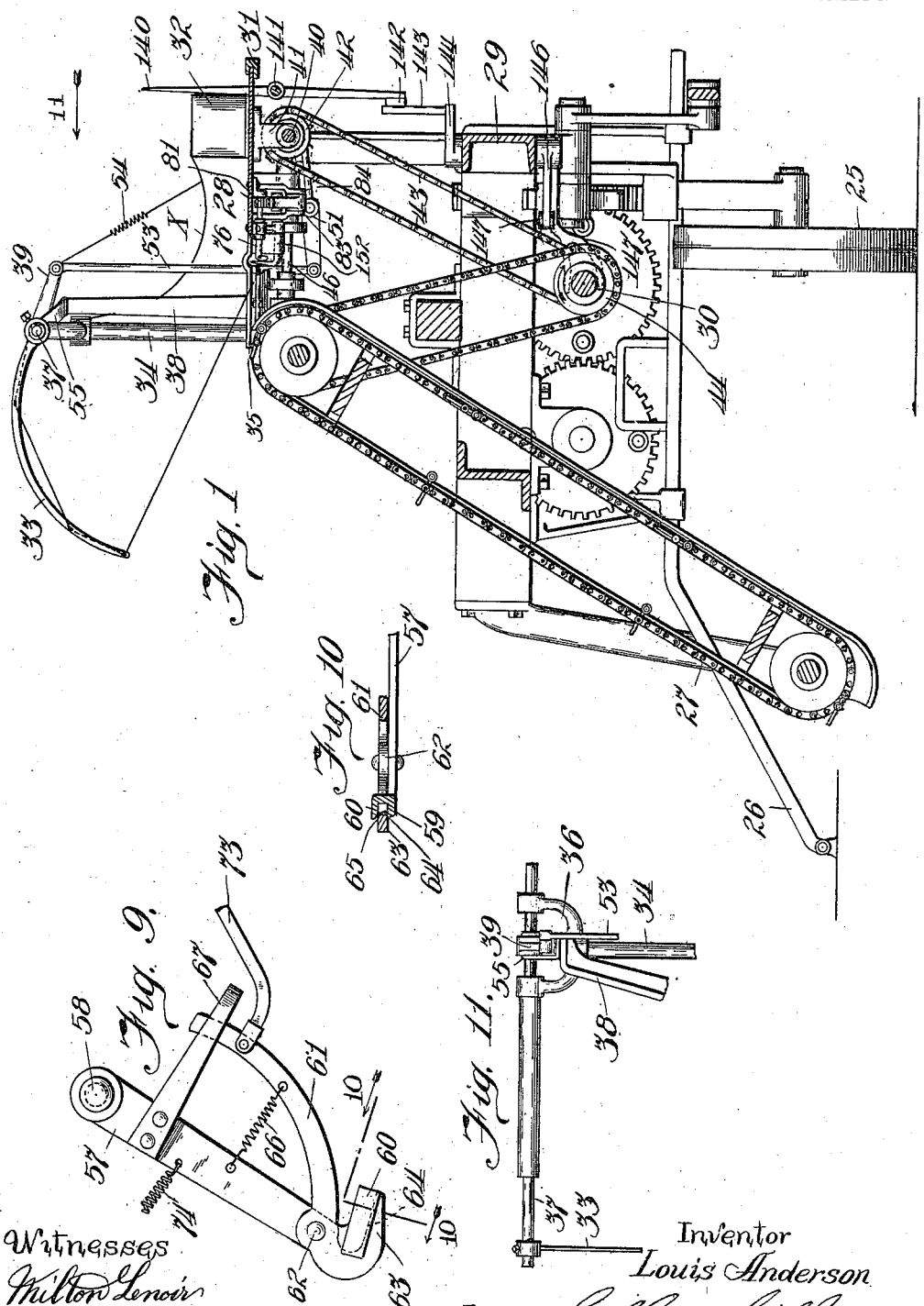
Witnesses
Milton Lenoir
E. M. Klatcher
Inventor
Louis Anderson
By Gillson & Gillson
Attorneys.

L. ANDERSON.
KNOTTER FOR HARVESTING MACHINES.
APPLICATION FILED OCT. 1, 1908.
984,639.
Patented Feb. 21, 1911.
4 SHEETS—SHEET 2.
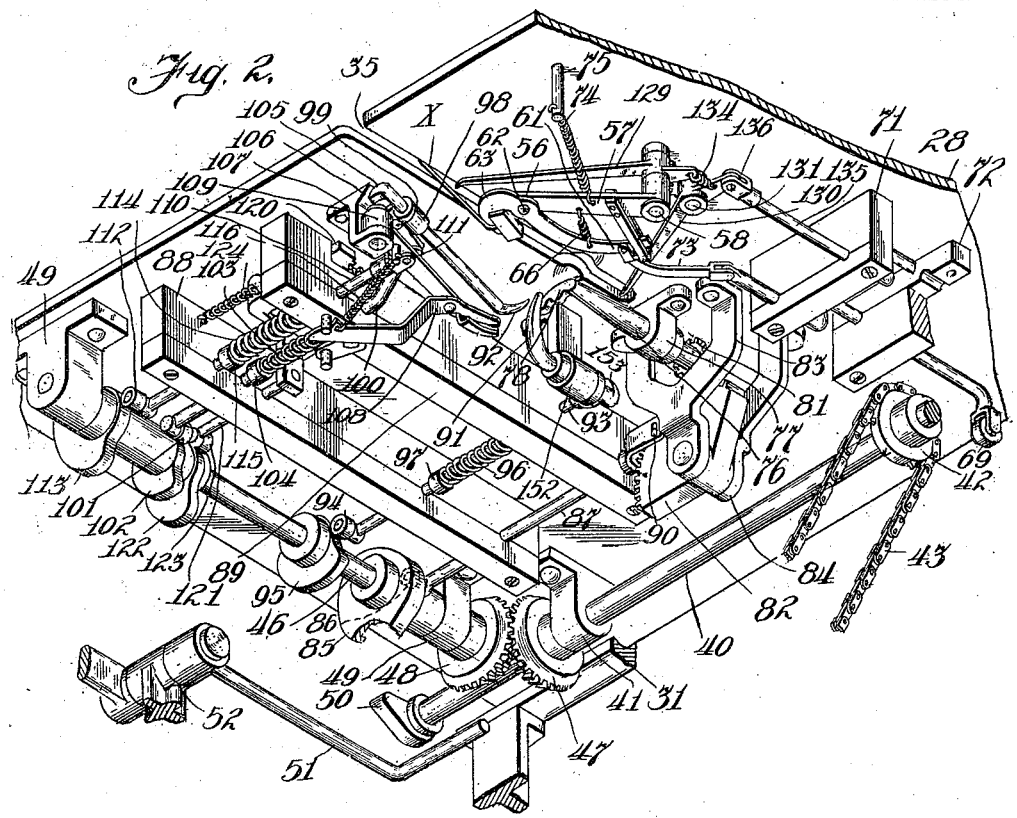
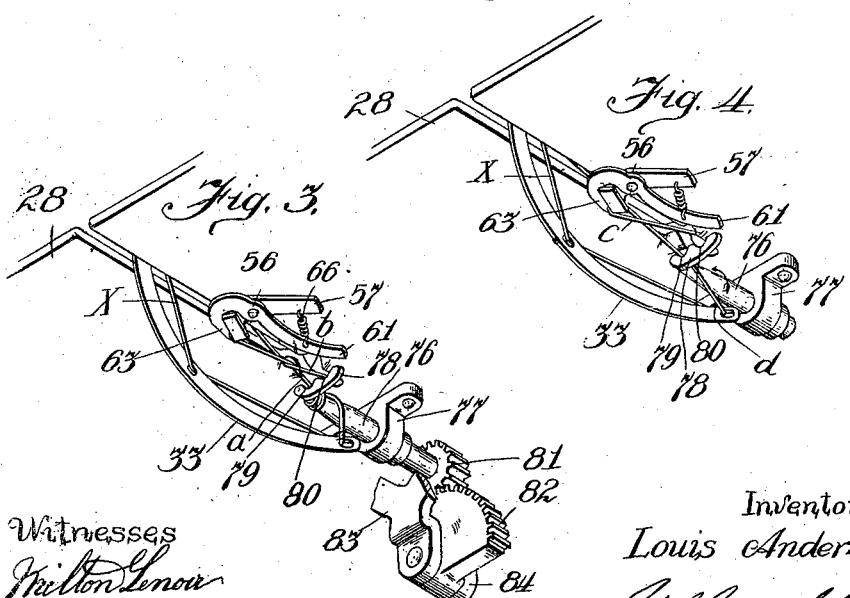
Witnesses
Inventor
Louis Anderson
By Gillson & Gillson
Attorneys.

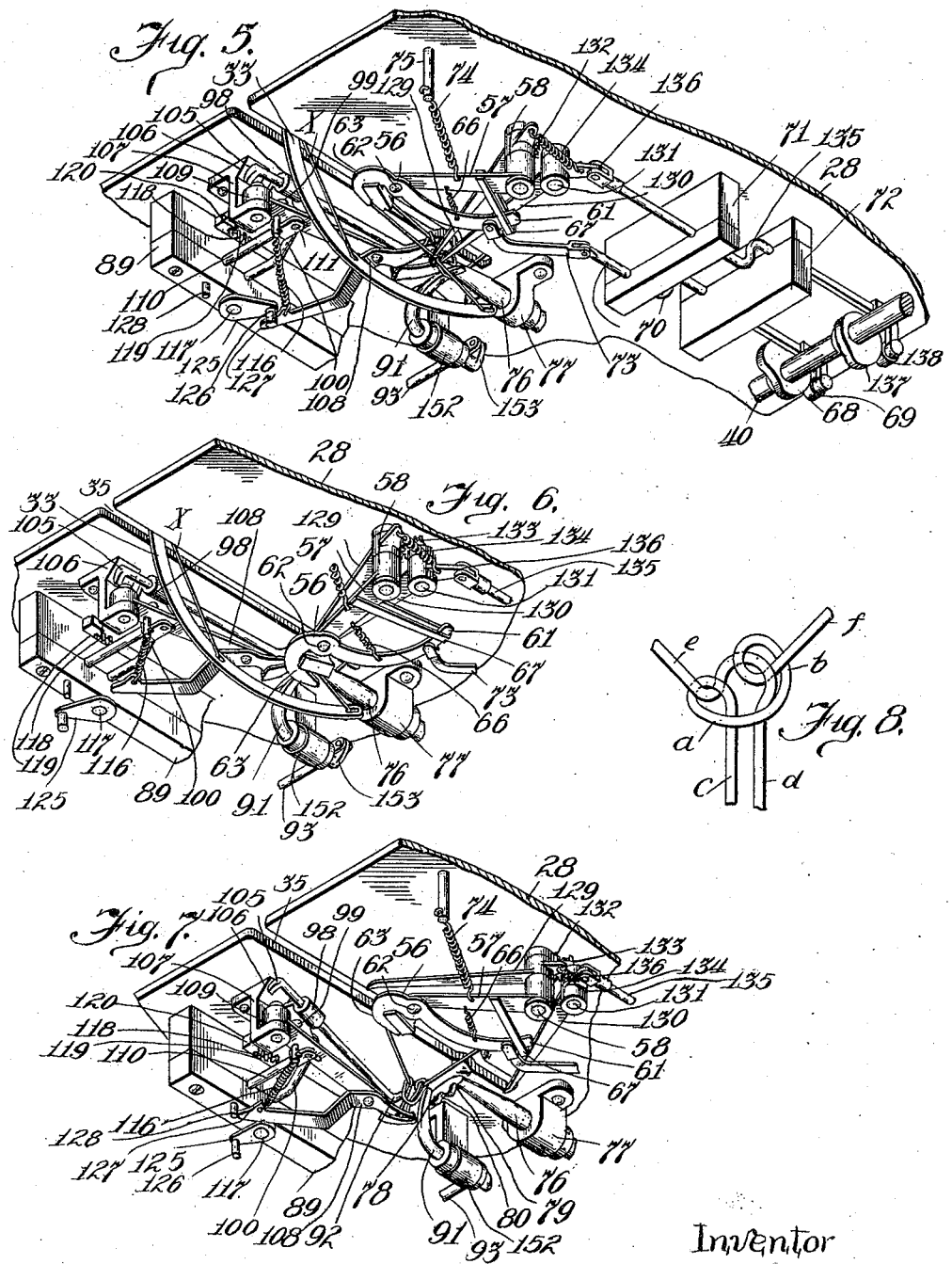

L. ANDERSON.
KNOTTER FOR HARVESTING MACHINES.
APPLICATION FILED OCT. 1, 1908.
984,639.
Patented Feb. 21, 1911.
4 SHEETS—SHEET 4.
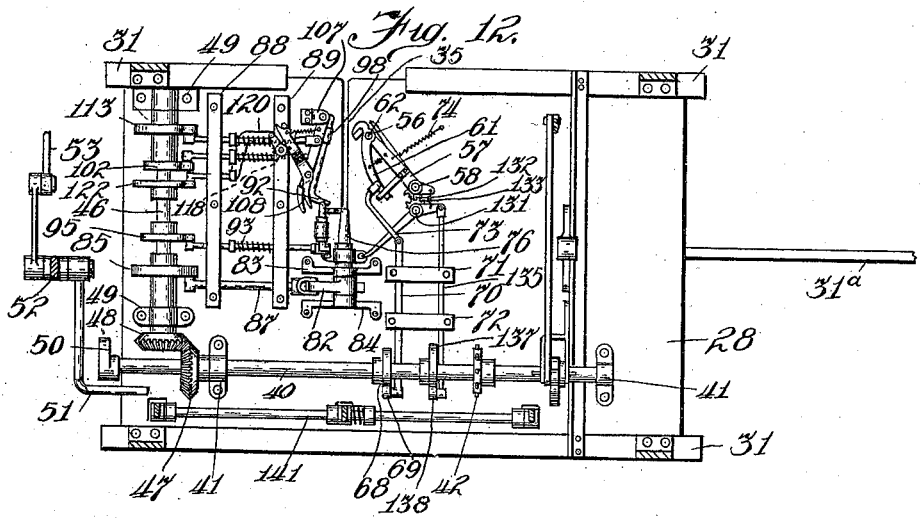
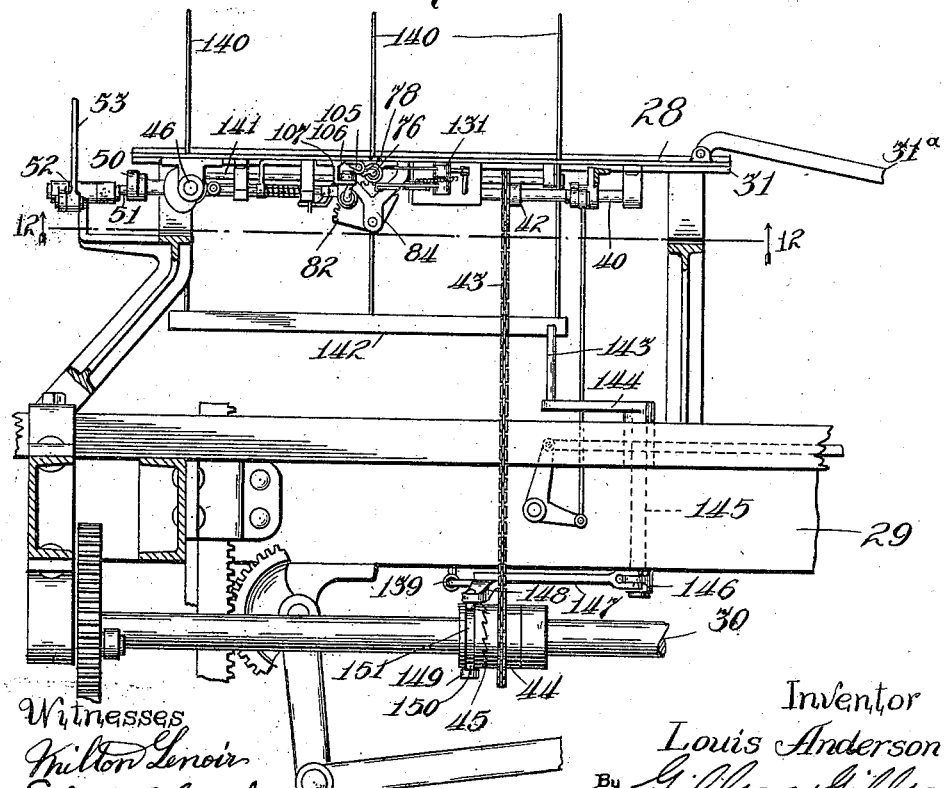
Witnesses
Wilton Lenoir
E. M. Klatcher
Inventor
Louis Anderson
By Gillson & Gillson
Attorneys.

UNITED STATES PATENT OFFICE.

LOUIS ANDERSON, OF CHICAGO, ILLINOIS.

KNOTTER FOR HARVESTING-MACHINES.

984,639.

Specification of Letters Patent. Patented Feb. 21, 1911.

Application filed October 1, 1908. Serial No. 455,653.

*To all whom it may concern:*

Be it known that I, LOUIS ANDERSON, a citizen of the United States, and resident of Chicago, county of Cook, and State of Illinois, have invented certain new and useful Improvements in Knotters for Harvesting-Machines, of which the following is a specification, and which are illustrated in the accompanying drawings, forming a part thereof.

The invention relates to harvesting machines adapted to bind the harvested material into bundles with twine, and more particularly to improved means for knotting together the ends of twine by means of which the material is secured.

The object of the invention is to simplify and improve the construction and operation of harvesting machines; and the invention is exemplified in the structure to be hereinafter described, and illustrated in the accompanying drawings, in which—

Figure 1 is a vertical cross-sectional view of a grain binder embodying the features of the invention; Fig. 2 shows in perspective details of the knot-forming mechanism as viewed from the under side of the table upon which the grain is supported during the binding operation; Figs. 3, 4, 5, 6 and 7 are similar to details of Fig. 2, but show the parts in the several different positions which they occupy during the various steps of the binding operation; Fig. 8 shows in diagram the form of knot produced by the machine; Fig. 9 is a detail plan view of a form of shears employed in the knot-forming mechanism for severing the twine and for retaining one of the severed ends; Fig. 10 is a detail sectional view taken on the line 10—10 of Fig. 9; Fig. 11 is a detail side elevation of the machine viewed in the direction of the arrow 11, Fig. 1; Fig. 12 is an inverted sectional plan view of the knot-forming mechanism the plane of the section being indicated by the line 12—12 on Fig. 13; and Fig. 13 is a detail longitudinal sectional view of the machine.

As shown the machine is of the type adapted for harvesting grain, and is supported by carrying wheels, one of which is shown at 25. As is usual in machines of this type, a reaper, details of which are shown at 26, is supported at one side of the machine. The binder mechanism, to which the grain moved by the reaper 26 is delivered by a traveling apron 27, comprises a table 28, upon which the grain is permitted to accumulate in sufficient quantity for the formation of a bundle.

The frame of the machine is designated, generally, by the numeral 29, and a driving shaft, adapted to be rotated in the usual manner by the rear carrying wheels (not shown), and to operate the reaper 26, the traveling apron 27, and the knot-forming mechanism, is illustrated at 30. The table 28 of the binder mechanism is preferably slidingly mounted in ways 31, formed on the frame 29, this construction being designed to provide for a suitable adjustment of the knot-forming mechanism with respect to the apron 27 for operating upon grain of various lengths. For sliding the table 28 in the ways 31, a handle lever (not shown) will ordinarily be provided, and will be most conveniently connected to the table by a link 31ª.

A twine receptacle 32 is mounted upon the frame 29 adjacent the table 28, and from this receptacle twine is delivered to a needle-arm 33, supported over the table 28 by a standard 34 rising from the frame 29. The twine X is threaded through the needle-arm 33, as most clearly shown in Fig. 1 of the drawings, and its loose end is normally secured in the knot-forming mechanism below the table 28, whereby it will be engaged by the grain delivered to the table by the apron 27, and drawn out thereby from the twine receptacle 32, through the needle arm 33, into the form of a loop partially surrounding the accumulating grain.

The needle-arm 33 is fixed to a crank-shaft 37, which is rotatably mounted at the top of the standard 34 to permit the needle-arm to swing downwardly through a slot 35 in the table 28 for compressing and for completely surrounding the grain with twine, when a sufficient quantity has accumulated upon the table 28 for the formation of a bundle. The free end of the needle-arm coöperates with mechanism below the table in knotting the twine about the grain.

Provision is preferably made for shifting the needle-arm 33 with the table 28, when the latter is moved for adjustment in the ways 31. As shown the head of the standard 34 is bifurcated, as indicated at 36, and the crank shaft 37, carrying at its outer end the needle-arm 33, is slidingly journaled in the two parts of the bifurcated head of the standard, and extends over the table 28.

A crank arm 39 is mounted on the crank shaft 37 between the two arms 36 of the bifurcated head of the standard 34, and a bracket arm 38 rises from the table 28, and has a bifurcated head 55 adapted to engage the crank arm 39 from opposite sides to maintain the needle-arm 33 in alinement with the slot 35.

The mechanism mounted upon the under side of the table 28 for coöperating with the needle-arm 33 in knotting the twine X about the grain, comprises a cam shaft 40 journaled in brackets 41 secured to the under side of the table 28, and carrying a sprocket wheel 42, over which turns a drive chain 43, which is intermittently actuated from a sprocket wheel 44 mounted on the drive shaft 30, to which it is connected by clutch mechanism 45. A second cam shaft 46, preferably extending at right angles to the shaft 40, to which it is operatively connected by bevel gears 47, 48, is journaled in brackets 49 secured to the under side of the table 28. A cam 50 is mounted on one of the cam shafts, as 40, for depressing the needle-arm 33. As shown, this cam coöperates with a lever 51, pivotally supported in a bracket-arm 52 carried by the frame 29, and said lever has its free end connected to the crank arm 39 by a link 53. A spring 54, reacting between the crank arm 39 and the frame 29 of the machine, is provided for raising the needle arm 33.

A pair of gripping shears 56, adapted to sever the twine X and retain one of the severed ends in its jaws, is preferably provided. As shown, one of the arms 57 of these shears is pivotally supported upon a stud 58, secured to the under side of the table 28 to swing in a horizontal plane beneath the slotted opening 35 in the table 28. The free end of this arm of the shears is socketed, as most clearly shown in Fig 10 of the drawings, one wall 59 of the socket being provided with a cutting edge, and the other wall 60 having a rounded gripping edge. The other arm 61 of the shears 56 is pivotally united to the arm 57 at 62. The free end 63 of this arm is adapted to coöperate with the walls 59 and 60 of the socket formed upon the end of the arm 57 for severing the twine X and for gripping one of the severed ends, one side of the end 63 of the arm having a cutting edge 64 and the other side being rounded, as shown at 65. A spring 66 reacts between the two arms 57, 61, of the shears 56 for closing the shears, and a loop 67, carried by one of the arms, as 57, of the shears and inclosing the other member, as 61, limits the opening of the shears.

A cam 68, mounted on the cam shaft 40, is provided for swinging the shears 56 about the pivot 58 in one direction. As shown, this cam coöperates with a cam-engaging roller 69, mounted upon the end of a rod 70, having a sliding support in bearing blocks 71, 72, secured to the under side of the table 28, and connected to the member 61 of the shears by a link 73. A spring 74, preferably stronger than the spring 66 reacting between the two members of the shears, reacts between the member 57 of the shears and a post 75 secured to the under side of the table 28 to swing the shears about the pivot 58 in the opposite direction from the swinging movement of the shears produced by the cam 68.

A rotating member 76, journaled in bearings, as 77, secured to the under side of the table 28, is provided for twisting together that part of the twine X delivered to the knotting mechanism by the needle-arm 33, and the end of twine retained by the gripping shears 56. As shown, this rotating member has mounted upon one end a radially directed arm 78, one side of which is notched, as indicated at 79, 80, for engaging the two parts of twine to be twisted together.

A gear pinion 81, is mounted upon the arm 76, preferably adjacent that end remote from the arm 78. This pinion meshes with a gear segment 82, rotatably mounted in hangers 83, 84, secured to the under side of the table 28 and having an oscillating movement for rotating the member 76. For oscillating the gear segment 82, a cam 85, preferably having a grooved side face, is provided. This cam, as shown, is mounted upon the cam shaft 46 and coöperates with a cam-engaging roller 86, mounted upon one end of a plunger 87, which is slidingly supported in bearing blocks 88, 89, secured to the under side of the table 28. The other end of the plunger 87, as shown, is forked to straddle the gear segment 82, the arms of the fork having a pin and slot connection 90 with opposite faces of the gear segment.

Means are employed for spreading the parts of twine twisted together by the rotation of the member 76 to provide an opening through which the ends of twine may be subsequently drawn for the formation of a knot. As shown, this spreading is effected by means of a pair of curved fingers 91, 92, which engage the twine at the points designated $a$, $b$, respectively, Fig. 3. The finger 91 is journaled in a bracket 152, mounted upon the under side of the table 28. A crank-arm 153, carried by the finger, is operatively connected to the end of a plunger 93, having a sliding support, preferably in the bearing blocks 88, and 89. At that end remote from its connection with the finger 91 the plunger 93 carries a cam-engaging roller 94, which coöperates with a cam 95, mounted on the cam shaft 46 for sliding the plunger 93 in its bearings to rotate the finger 91. A spring 96, coiled about the plunger 93 and reacting between a collar 97 mounted on the plunger and the bearing block 89, serves for maintaining the cam-engaging roller 94 in contact with the cam 95 and for returning the plunger after it has been shifted by the cam.

The finger 92 is rotatably mounted in a crank arm 98, pivotally secured to the under side of the table 28 at 99, and means are provided for rotating the finger and for swinging the crank arm. As shown, one end of the crank arm 98 is operatively connected to a plunger 100, preferably having a sliding support on the bearing blocks 88, 89, and carrying a cam-engaging roller 101. A cam 102, mounted on the cam shaft 46, coöperates with the cam-engaging roller 101 to move the plunger 100 against the effort of a spring 103, coiled about the plunger 100 and reacting between a collar 104, carried by the plunger, and the bearing block 89, for swinging the crank-arm 98. For rotating the finger 92 in its bearing upon the crank arm 98, the finger is preferably provided with a cam-engaging heel 105, adapted to engage a stationary cam 106, when the finger is moved by the swinging of the crank arm 98. As shown, the cam 106 is formed upon a bracket member 107, secured to the under face of the table 28.

A pair of tweezers 108, adapted to be advanced through the loop formed by a spreading of the strands $a$, $b$, Fig. 3, by the fingers 91, 92, are provided for drawing the ends of the twine leading to the needle-arm 33 and gripping shears 56, respectively, through this loop upon their return movement to form a knot. As shown these tweezers are mounted to swing in a horizontal plane, one arm of the tweezers being pivotally mounted at 109 on the bracket 107. For swinging the tweezers about the pivot 109, a plunger 110, operatively connected to the pivotally-supported arm of the tweezers at 111, is provided. This plunger has a sliding support in the bearing blocks 88, 89, and carries a cam-engaging roller 112, which coöperates with a cam 113, mounted on the cam shaft 46 for swinging the tweezers. A spring 114, coiled about the plunger 110 and reacting between a collar 115 mounted on the plunger and the bearing block 89, serves to maintain the cam-engaging roller 112 in contact with the cam 113 and to swing the tweezers about the pivot 109 in opposition to the cam.

A spring 116 reacts between the arms of the tweezers 108 to close the tweezers, and means are provided for opening the tweezers when they have been advanced through the loop formed by the separation of the strands $a$, $b$, of twine and when they are returned to their normal position. For opening the tweezers when they are advanced through the loop, a crank shaft 117, Fig. 7, journaled in the bearing block 89, is preferably provided. This crank shaft carries adjacent one of its ends a gear pinion 118, preferably mounted within a recess 119, formed in the bearing block 89. For rotating the crank shaft this gear pinion is operatively engaged by a gear rack 120, carried by a plunger 121, which, as shown, has a sliding support in the bearing block 88. This plunger is moved in one direction, by a cam 122 mounted on the cam shaft 46, which coöperates with a cam-engaging roller 123 carried by the plunger, and in the other direction, by a spring 124, preferably reacting between the gear-rack 120 and the bearing block 88. A crank 125, is mounted on the crank shaft 117, and carries at its free end a tappet 126, adapted to engage one arm of the tweezers 108, as at 127, Fig. 7, when the tweezers are advanced and the crank shaft is rotated for opening the tweezers. A stud 128, mounted in the bearing block 89, and adapted to be engaged by the end 127 of one arm of the tweezers, is preferably provided for opening the tweezers when they are returned to the retracted position.

A pair of arms 129, 130, are provided for drawing those portions of the twine designated $c$, $d$, which lead from the gripping shears 56 and from the needle-arm 33, respectively, together in front of the loop formed by a spreading of the portions $a$, $b$, by the fingers 91, 92, in position to be grasped by the tweezers 108. These arms are mounted to swing in a horizontal plane, preferably upon the stud 58 and upon a companion stud 131, respectively. They are provided with intermeshing gear segments 132, 133, whereby they move simultaneously and in opposite directions. As shown, a spring 134 reacts between the arms to separate them, and they are brought together by means of a plunger 135, operatively connected to one of the arms at 136. The plunger 135 has a sliding support, preferably in the bearing blocks 71, 72, which, as shown, are provided for supporting the plunger 70, and a cam 137, mounted on the cam shaft 40, serves for moving the plunger in one direction. A roller 138 is carried by the plunger 135 for engaging the cam 137, and the spring 134, reacting between the arms 129, 130, constantly maintains the roller in contact with the cam.

Preferably the cam shafts 40 and 46 are rotated only when a sufficient quantity of grain has accumulated upon the table 28 to form a bundle. To this end, the movable member of the clutch mechanism 45 is normally maintained out of contact with the sprocket wheel 44 by a spring 139, and automatic means are provided for closing the clutch. As shown, contact fingers 140 are mounted upon the far side of the table 28 from the delivery apron 27. These fingers are adapted to be shifted by pressure of grain against them to close the clutch mechanism 45. Preferably the fingers 140 are carried by a rock-shaft 141, journaled on the table 28 of the machine, and the lower ends of the fingers are connected by a tappet bar 142. A stud 143, carried by the crank arm 144 of a vertically-disposed crank shaft 145, projects into the path of the tappet bar 142. A second crank arm 146, carried by the crank shaft 145, is operatively connected by a link 147 to a clutch-shifting member 148, pivotally secured to the frame of the machine, and having a forked free end 149, which straddles the movable member of the clutch mechanism 45, the arms of the fork being provided with inwardly-directed studs 150 which run in a circumferential groove 151 formed in the movable member of the clutch.

During the operation of the harvesting machine, as shown, the cam shafts 40 and 46 are rotated by the sprocket chain 43 from the driving shaft 30, when the clutch mechanism 45 is closed by pressure of grain against the fingers 140. The end of twine remaining from the tying of the last bundle of grain is secured in the gripping shears 56, and the twine leads from the receptacle 32 by way of the needle-arm 33, through the slot 35 provided in the table 28, to the gripping shears 56. Rotation of the cam shaft 40 causes the needle-arm 33 to swing downwardly through the slot 35, bringing that part of the twine adjacent the point of the needle-arm in front of one of the notches, as 79, formed in the arm 78 of the rotating member 76. A further rotation of the cam shaft 40, and with it the cam shaft 46, causes the member 76 to rotate by reason of the shifting of the plunger 87 by the cam 85 to swing the gear segment 82, the rotation of the gear segment 82 and pinion 81 being preferably such that during the shifting of the gear segment the member 76 turns through one and one-half revolutions. During this rotation of the member 76, the twine is engaged at a point adjacent the gripping shears 56 and adjacent the needle-arm 33, these parts of the twine being at opposite ends of the portion surrounding the bundle of grain, by the finger 78, and twisted to the position illustrated in Fig. 3 of the drawings. The parts $a$, $b$, of the twine are now separated by a movement of the fingers 91, 92, and that part of the twine next adjacent the end of the needle-arm, together with that part next adjacent the end held by the gripping shears 56, are brought together in front of the loop thus formed by a swinging of the arms 129, 130. The tweezers 108 are then advanced through the loop or opening provided by a spreading of the portions $a$, $b$, of twine by a shifting of the plunger 110 by the cam 113, and the mouth of the tweezers is opened by a rotation of the crank shaft 117, causing the tappet 126 to contact with the free end 127 of one of the arms of the tweezers. A further rotation of the crank shaft 117 causes the tappet 126 to move out of contact with the free end 127 of one of the arms of the tweezers, and the tweezers are thereupon immediately closed upon the two portions of twine brought together by the arms 129, 130. The end of the twine is now released by the opening of the gripping shears 56, caused by a movement of the plunger 70. A further movement of the plunger 70, by reason of the loop 67 which limits the opening of the shears, causes the shears to swing in a horizontal plane to grasp the twine adjacent the point where it leaves the free end of the needle-arm 33. The shears are then released and they are then immediately closed by the spring 66, causing the twine leading from the end of the needle arm to be severed while gripping the severed end adjacent the needle-arm. The spring 74 returns the gripping shears to their original position, thereby drawing twine from the receptacle 32 through the needle-arm.

By the release from the gripping shears 56 of the old end of twine remaining from the tying of the last preceding bundle of grain, and by the severing of the twine adjacent the needle-arm 33, the portions of twine held by the tweezers 108 are freed at one side of the tweezers. All of the other parts of the twine, except the newly formed end now retained by the gripping shears 56, are also released by a counter-rotation of the member 76 and by a return movement of the fingers 91, 92; and by a return movement of the tweezers 108 effected by the stout spring 114, the two ends of twine held by the tweezers are drawn through the loop through which the tweezers had passed to grasp them, and a tightly drawn knot is produced. This knot is diagrammatically represented in Fig. 8 of the drawings, wherein the portions of twine designated $c$, $d$, are the loose ends which have been drawn by the tweezers 108, through the loop formed by the spreading of the portions $a$, $b$, by the fingers 91, 92, and the portions designated $e$, $f$, are the ends of the band surrounding the bundle of grain.

When the tweezers 108 have completely reached their retracted position, the mouth of the tweezers is opened by contact with the end 127 of one of the arms of the tweezers with the stud 128. The ends of twine are thus released and the bundle of grain may now be removed, thus releasing the fingers 140, whereby the clutch mechanism 45 is opened by the spring 139 and the cam shafts 40 and 46 are brought to rest.

I claim as my invention—

1. In a twine knotter, in combination, a twine grip, a needle-arm movable toward and away from the grip, a rotatable member engageable with the twine held by the grip and by the needle-arm, spreading fingers engageable with the two parts of twine twisted by the rotatable member, and a second twine grip reciprocable between the spreading fingers.

2. In a twine knotter, in combination, a twine grip, a needle-arm movable toward and away from the grip, a rotatable member engageable with the twine held by the grip and by the needle-arm, spreading fingers engageable with the two parts of twine twisted by the rotatable member, and a spring-retracted reciprocable twine grip movable between the spreading fingers.

3. In a grain binder, in combination, a grain-receiving table having an opening, a twine grip mounted on the under side of the table adjacent the opening, a needle-arm movable over the table and through the opening, a rotatable member journaled on the under side of the table engageable with the twine held by the grip and with that delivered through the opening by the needle-arm, spreading fingers engageable with the twine twisted together by such member, oppositely swinging arms for assembling in front of the loop formed by the spreading fingers the twine held by the grip and by the needle-arm, and a pair of oscillatable tweezers movable through the loop to engage the assembled twines and draw them through the loop.

4. In a twine knotter, in combination, a pair of jaws having coöperating cutting and gripping faces, a needle-arm movable toward and away from the jaws, loop-forming mechanism operable upon twine held by the jaws and delivered by the needle-arm, a pair of tweezers oscillatable through the loop, and means for opening the jaws and moving them into engagement with the twine delivered by the needle-arm.

LOUIS ANDERSON.

Witnesses:
    CHARLES B. GILLSON,
    LOUIS K. GILLSON.